March 12, 1968  G. B. GREENE  3,372,501
PNEUMATIC DISPLAY SIGN
Filed Feb. 23, 1966  2 Sheets-Sheet 1
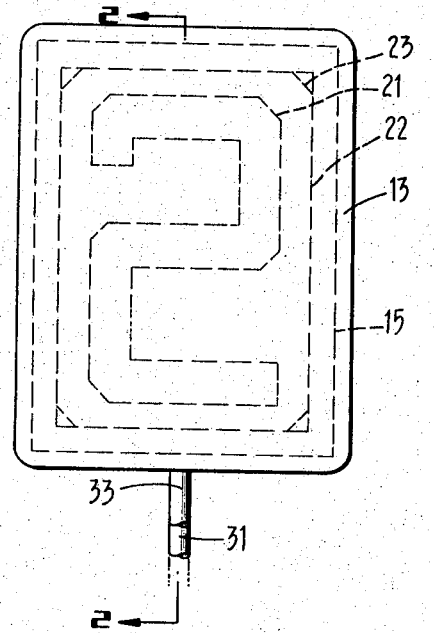
FIG_1
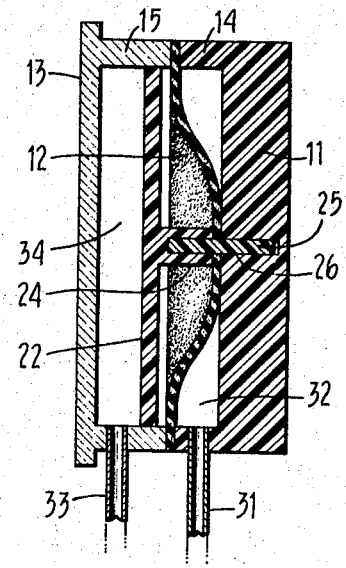
FIG_2
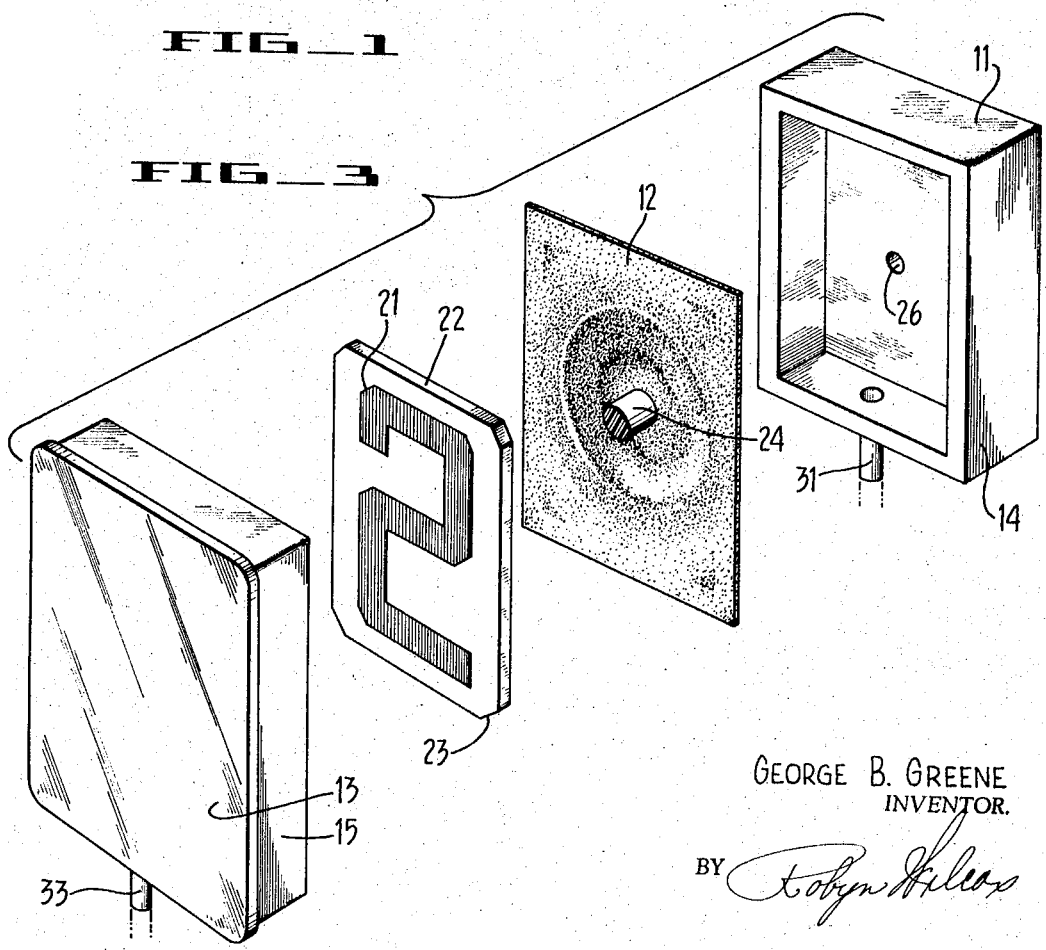
FIG_3
GEORGE B. GREENE
INVENTOR.
BY
ATTORNEY March 12, 1968  G. B. GREENE  3,372,501
PNEUMATIC DISPLAY SIGN
Filed Feb. 23, 1966  2 Sheets-Sheet 2
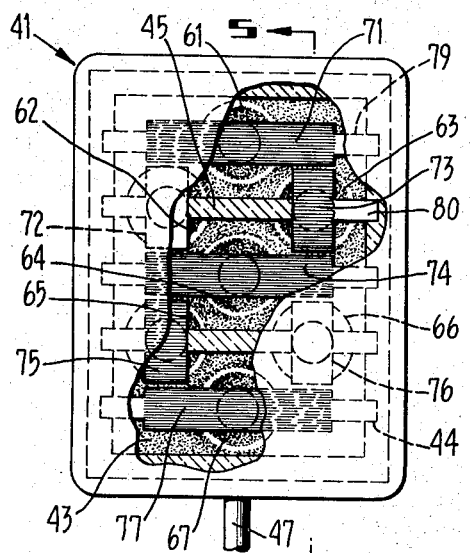
FIG_4
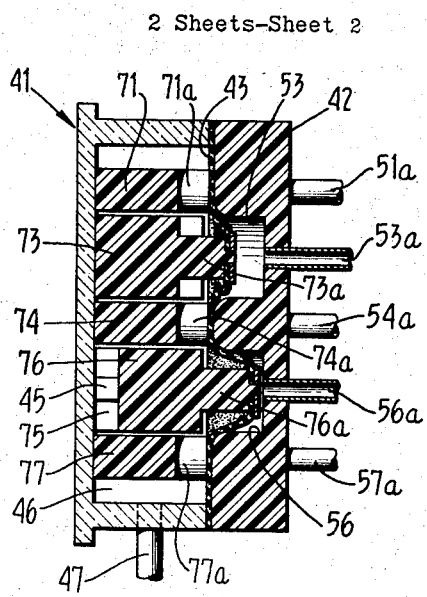
FIG_5
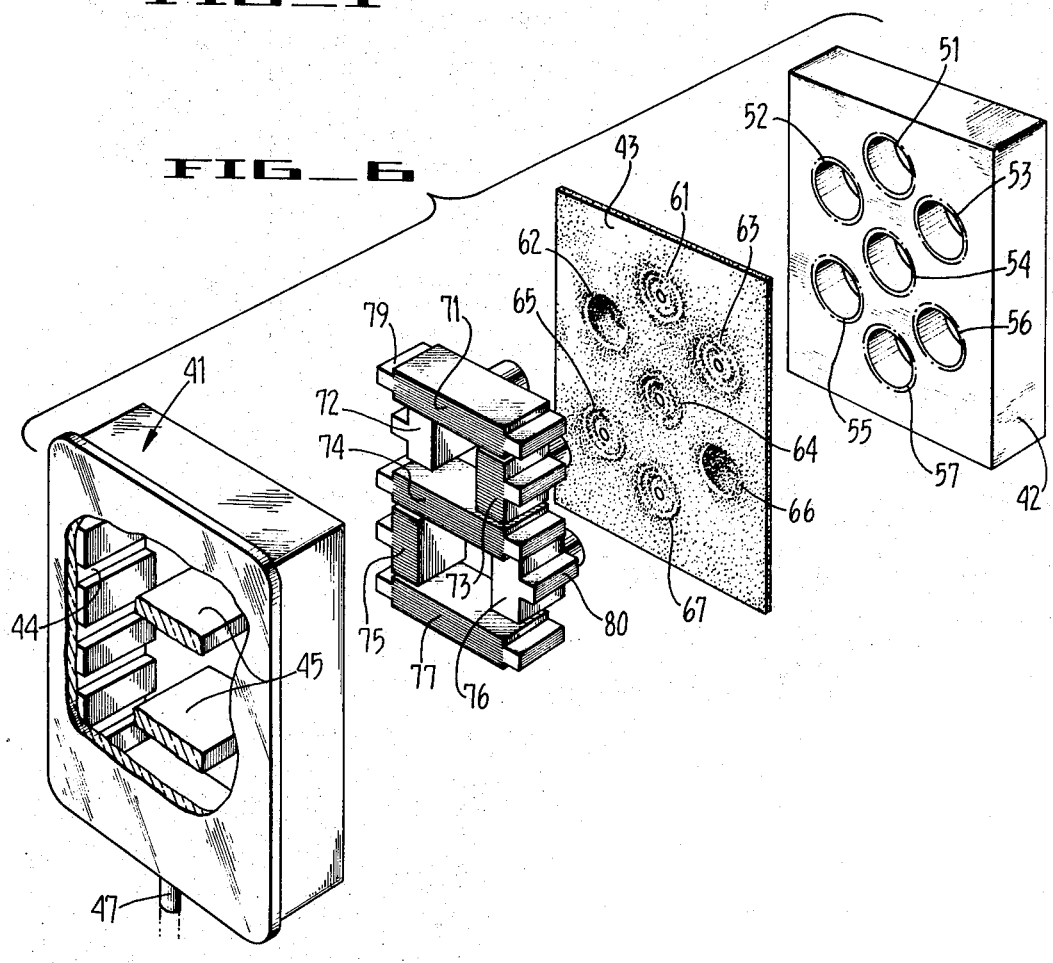
FIG_6

United States Patent Office 3,372,501
Patented Mar. 12, 1968

3,372,501
PNEUMATIC DISPLAY SIGN
George B. Greene, Lafayette, Calif.
(2501 Anniversary Lane, Newport Beach, Calif. 92660)
Filed Feb. 23, 1966, Ser. No. 529,417
6 Claims. (Cl. 40—28)

This invention relates to a display device and particularly one which is operated by a fluid, such as air.

A primary purpose of the present invention is to provide a display device which is operated by a fluid, such as air, operating under slight pressure or a slight vacuum; and, in its preferred form, will retain the setting of the display until positively changed by a reversal of pressure.

Another important object of the present invention is to provide a display in which the face of the display is a translucent material, such as frosted glass or plastic, through which a luminescent character will be readily visible when lying closely adjacent to the face, but which will not be visible when removed a slight distance therefrom, and in this respect, is quite similar in effect to the patent of Pichel No. 3,237,591 issued Mar. 1, 1966.

A still further important object of the present invention is to provide an improved display device.

These and other objects of the invention will be apparent from a consideration of the following description of two preferred embodiments of the invention, which will be readily understood by reference to the drawings, in which:

FIG. 1 is a front view of the simple, single character display device of one embodiment of the invention, the character being in a "no-display" position;

FIG. 2 is a cross-sectional elevational view of the display device taken along the plane indicated by the line 2—2 of FIG. 1;

FIG. 3 is an exploded perspective of the device illustrated in FIGS. 1 and 2;

FIG. 4 is a front view of a second embodiment of my invention in which different characters, such as those formed by the common "box 8," or "block 8," display may be registered, and, as an example, showing the numeral "2";

FIG. 5 is a cros-sectional view of the device of FIG. 4 taken along a plane indicated by the line 5—5 of FIG. 4; and FIG. 6 is an exploded perspective of the mechanism shown in FIG. 4.

This invention relates to a display in which a character, or characters, is viewable through a translucent window; and hence is invisible when spaced away from the window, and becomes visible when moved to a position adjacent the window. In this invention, I am using the word "translucent" in the sense that it admits and diffuses light but does not give a clear sight of what lies beyond, so that objects beyond cannot be clearly distinguished, but is partially transparent to objects immediately adjacent thereto. An excellent example of such a display is that shown and described in the patent to Pichel No. 3,237,-591 issued Mar. 1, 1966. In the present invention, I prefer a translucent material, such as frosted glass, or frosted plastic, and that the character to be displayed be printed with a luminescent paint, or other material that is readily distinguishable through the translucent window when in the space immediately adjacent to it.

In my invention, I position the character to be displayed either remote from, or adjacent to, the translucent window, by fluid pressure, such as air. In this invention, the pressure is applied to a flexible diaphragm which, in its preferred form, is "dished" or "cup-shaped," to give a toggle effect in which the diaphragm will remain in either position to which it is moved. In this preferred form, a pulse of fluid, such as air, under pressure, will move the diaphragm to an extreme position, such as adjacent the window; and thereafter the diaphragm will remain in that position until a pulse from the other direction moves it to the other extreme, e.g., away from the window. With this preferred form of diaphragm, it is evident that the indicia of the display is viewable through the window until the reverse pulse positively forces it to the "no-show" position, and vice versa. In this sense it can be said that this form of diaphragm has a "memory." It will be obvious, of course, that my invention will be operable with an ordinary planar diaphragm, in which case it would be necessary (in the form shown in FIG. 2) to maintain the pressure on the backside of the diaphragm so long as a display position was desired.

It will also be understood that when I speak of "pressure," I mean a pressure differential across the diaphragm. In fluid-operating devices, this normally means that air under a pressure greater than atmospheric is applied to one side of the diaphragm, while the other side is vented to the atmosphere, or that a vacuum is applied to one side of the diaphragm, while the other is vented to atmospheric pressure. However, it will be readily understood that both pressures could be greater than atmosphere, or both could be less, so long as there is a differential between the two which will move the diaphragm in one direction or the other. It will, therefore, be understood that when I speak of "pressure" being applied to one side of the diaphragm, I mean that the pressure on that side is greater than on the other, regardless of the means by which the differential in pressures is accomplished.

Many indicating devices are used only to indicate that a particular operation is in process, or that a particular condition exists, or a machine is set to do a particular action when operated, or the like. In effect, these are "on" and "off" indicators, which, in the past, have commonly used a light which burned to show the "on" condition.

The simplest form of my invention is shown in FIGS. 1, 2 and 3, and discloses an indicating device in which only a single character will be displayed, or not.

In this simple embodiment of my present invention, the indicating device, or display, comprises a casing member 11 and a cover plate, or window, 13, the two being rigidly secured to one another by some suitable means (not shown) and embracing an imperforate diaphragm 12 between them. It will be understood that the cover 13 will be of a suitable translucent material which admits the passage of light, but not a clear sight of what lies slightly removed from it, such as frosted glass, or plastic.

Preferably, the diaphragm 12 is of a cup, or dish, shape, or, as it is sometimes called, a "toggle" diaphragm. Such a diaphragm is larger than the cross-sectional area of the chambers formed by the diaphragm and associated casing, or cover, and preferably is molded into the desired dish shape. The advantage of such a diaphragm is that it will remain in whichever position it is placed until a force is applied to move it to the other position. It will be obvious, however, that a planar diaphragm could be used, in which case pressure would have to be maintained on the proper side to keep it in the adjusted position. Associated with the preferred type of diaphragm, it is also, of course, necessary to provide chambers of a depth sufficient to cover the required movement of the indicia from a "show" to a "no-show" position. This is readily accomplished by providing the casing 11 and the cover 13 with sidewalls 14 and 15, respectively, in order to form two concave sections with the diaphragm 12 clamped between their concavities.

The display, such as an indicia 21, is preferably placed on a plate 22 which is of such size and shape as to avoid twisting in the chamber formed by the diaphragm 12 and the cover 13, but which will allow the free passage of the pressure through it, or around it, as by rounding or chamfering the corners, as shown at 23. It will be obvious that the indicia 21 should be made of such material, or painted in such a color, as to be readily seen when it is adjacent the face of the cover 13. For this purpose, I usually prefer to use a fluorescent, or luminescent, paint. It will also be readily understood that the indicia could be placed directly upon the diaphragm, but that would normally require a much larger display casing, as only a small section of the diaphragm 12 would lie adjacent the window, even in the most extreme conditions. Therefore, I prefer to place the indicia 21 on a suitable plate 22, connecting the plate 22 to the diaphragm 12 by any suitable means, such as spacer 24. If desired, a guide pin 25 can be mounted on the plate 22 and extending into a suitable guide channel, such as the hole 26 in the back of the casing, to hold the plate 22 parallel to the window 13 at all times.

A fluid conduit 31 communicates with a chamber 32 formed by the casing 11 and the diaphragm 12. A similar fluid conduit 33 communicates with a chamber 34 defined by the cover 13 and the diaphragm 12. As mentioned above, these conduits may supply fluid, such as air, under pressure; or they may apply a vacuum thereto; and when pressure or a vacuum is applied to one chamber, the other may be vented to atmosphere. The valves, and their controls, which apply the pressure differential to the diaphragm 12, can be those well-known in the art, and, therefore, do not need to be shown or described.

It is important to note, however, that if air under pressure is applied through conduit 31 to the chamber 32, and chamber 34 is vented to atmosphere through conduit 33, the diaphragm 12, and consequently the display plate 22, will be moved toward the face of the display (to the left in FIG. 2). In this event, the plate will either abut, or lie immediately adjacent to, the face of the cover 13. In this condition, the indicia 21 on the face of the plate 22 will be readily visible to an operator. Obviously, the same results would be secured if vacuum were applied to chamber 34 while chamber 32 was vented to atmosphere because, in that case, the pressure in chamber 32 would be greater than that in chamber 34. If, on the other hand, fluid under pressure is applied through conduit 33 to chamber 34 and chamber 32 is vented to atmosphere through conduit 31; or a vacuum is applied to chamber 32 and chamber 34 is vented to atmosphere the indicia plate 22 will be moved by the operation of the diaphragm 12, away from the face of the cover 13. In this event the indicia 21 would no longer be visible through the cover 13.

It is obvious that the indicia 21 on the indicia plate 22 will be readable whenever the plate is adjacent the window, or face, of the cover 13, and will not be visible when retracted to the position shown in FIG. 2. It is also obvious that the movement of the diaphragm, and hence the plate 22, can be readily secured by a slight pressure differential, and that the apparatus will operate rapidly, and to a full-stroke position, either to a display or to a retracted position, by the short application of small pressure.

While I have shown preferred forms in which the casing is formed of two sections and the diaphragm is clamped between them, it will be obvious that the invention would be operable with only the window section of the casing and the diaphragm affixed thereto. For example, in the embodiment shown in FIGS. 1 to 3, it would be only necessary to have the front, or cover, section of the casing 15 and the diaphragm 12; and the back section 11 could be removed. In that event, the conduit 33 would be used to apply a vacuum to chamber 34 and hence suck the diaphragm 12 to the left to display the insignia. When it was desired to remove the display, the vacuum could be released to allow air under atmospheric pressure to enter the chamber 34, if the diaphragm 12 were a single planar diaphragm; or a fluid under pressure would be introduced through the conduit 33 to force the diaphragm rearwardly, if it were of the dished variety. It is obvious, of course, that the single chamber and diaphragm can be used, as there is a pressure differential applied to the two faces of the diaphragm. However, this arangement is generally not as satisfactory as the one described in detail, since it is usually more convenient to apply either a positive pressure or a vacuum to one or the other side of the diaphragm in order to effect movement, than it is to have to apply both to a single chamber, such as 34.

A second embodiment of my invention is shown in FIGS. 4, 5 and 6, and shows a form in which a plurality of characters can be selected and displayed. For purposes of exemplification, I show a display using the common "box 8" type of indicia in which seven separate lines are arranged to form a "box 8." A selected number of these lines can be displayed to form any of the numerals and a number of letters to indicate which one of a plurality of states is existent. In FIG. 4, for example, the numeral "2" is displayed, which may be used to show that a computer has accumulated a total of "2," or that a machine is in the second phase of a programmed operation, or the like.

This embodiment of my invention utilizes a casing which is preferably formed in two sections: a cover plate 41 having a translucent face, or window, and a body portion 42. The back section 42 of the casing is formed with a plurality of discrete diaphragm chambers 51 to 57 (FIG. 6) corresponding to the several lines to be used in the various indicia to be displayed. In the embodiment shown, there are seven chambers corresponding to the seven lines of the well-known "block 8" configuration. Each chamber 51 to 57 will be connected to a source of suitable pressure, preferably vacuum, by means of conduits which are identified by the reference characters of the chamber they serve plus the suffix *a*.

A diaphragm 43 is placed between the two sections, and the three elements assembled in fluid-tight assembly by any suitable means, not shown. Preferably, the diaphragm will be of the dished type described in connection with the embodiment shown in FIGS. 1 to 3, but will have a plurality of "cups" 61 to 67 (seven are shown in the illustrated embodiment) and correspond to the chambers 51 to 57 in the body 42. The diaphragm 43 could be a series of individual cup-shaped diaphragms, one for each chamber of the display, but preferably would be a single diaphragm with the seven cups formed integrally therein.

The lines of the display will correspond to the lines of the total display. In the embodiment shown they correspond to the well-known "box 8" or "block 8" configuration. Thus, the display will contain three horizontal bars 71, 74 and 77; two vertical bars 72 and 75 adjacent the left ends of the horizontal bars 71, 74 and 77; and two vertical bars 73 and 76 adjacent the right ends of the horizontal bars. Each bar of the display is connected to the respective cup of the diaphragm by a suitable stem identified by the suffix *a* and the number of its bar.

In order to keep the various horizontal bars 71, 74 and 77 properly positioned for the "block 8" configuration, I provide an ear 79 on each end of these bars. These ears 79 slide in notches 44 formed in the walls of the cover 41. Similarly, the vertical bars 72, 73, 75 and 76 are formed with ears 80 on the outside of these bars, which ears slide in other notches 44 in the walls of the cover 41. The vertical bars are further kept in proper alignment by a pair of ribs 45 which extend rearwardly from the face of the cover and engage the inner sides of these bars. The various ears 79 and 80, the notches 44, and the guide bars 45 are preferably formed of plastic, so that when properly dimensioned the bars will move freely when a slight pressure differential is applied to the diaphragm.

The cover preferably will form a single chamber 46 which communicates with a fluid under pressure by a suitable conduit 47. In this type of structure, I would prefer to cement the diaphragm to the back section of the casing in order to avoid leakage between the chambers therein. Alternatively, the front section can be formed with a plurality of chambers to embrace the lines, or strokes, of a "box 8" configuration and complementing the chambers in the back section.

In this form, some coding device can be used to supply greater fluid pressures to selected ones of the chambers 51 to 57 in the body portion 42, and a lesser pressure to the chamber 46 in the cover plate 41, to force the respective segments of the diaphragm forwardly, and hence press selected ones of the bars 71 to 77 against the window of the cover plate 41. The same effect can be secured by applying a greater pressure (such as atmospheric) to the front chamber 46 and lesser pressure (such as a slight vacuum) to the other diaphragm chambers, and thereby sucking the other bars rearwardly and out of sight. Since the coding device is no part of the present invention it will not be described, but those skilled in the art can readily suggest devices for coding information into a combination of discrete fluid-pressure pulses. Thus, to display the figure "2" shown in FIG. 4, a fluid (such as air) under a slight vacuum is applied to the chambers 52 and 56 to hold the bars 72 and 76 rearwardly. At the same time a slight pressure is applied to chambers 51, 53, 54, 55 and 57 to force their respective bars forwardly to abut the window. Or, if all of the bars are set to a common position at the start, only one pressure need be applied to the chambers whose bars are to be moved. For example, if all of the bars 71 to 77 were forced forwardly to lie against the window, and chamber 46 were vented to atmosphere, it would only be necessary to apply vacuum to chambers 52 and 56 to retract their respective bars to display the number "2." It will be obvious that any of the characters which can be formed by the "block 8" arrangement can be displayed by the selective application of a pressure differential to the respective sections of the diaphragm.

It will be apparent that my invention will have applications to many types of displays, either those in which a single character is to be displayed or not, such as to show an "on" and "off" condition, or can be applied to variable displays, such as those which can be shown from a "block 8" arrangement. It will also be understood that a display of this type can take many forms and the indicia to be shown can be varied.

It will further be seen that the display is activated by a slight pressure differential, as the only moving part is the movement of the diaphragm and its associated display plate. If it is desired to provide a display with a memory in the sense that a character once displayed will remain on display until positively changed, then the dish-shape diaphragms will be preferred, as they normally will remain in either extreme position. If a memory is not desired, that is, merely to show a condition so long as a condition exists, then, of course, the diaphragm can be the common planar diaphragm which will be moved to one extreme position and remain there as long as the pressure differential exists and will then return to its normal position, which usually would be a "no-display" position. It is believed to be obvious that the display of my invention can be of any desired size or shape; that the indicia can be of any desired character, word or phrase; and that if a multi-indicia is desired, the complete configuration can be of any desired combination of lines, strokes, or the like.

I claim:
1. A display comprising:
   a casing having a translucent window;
   a diaphragm mounted to divide said casing into opposed chambers and so arranged as to be movable to lie adjacent said window or remote therefrom;
   an indicia carried by said diaphragm; and
   means for applying a fluid pressure to said diaphragm to move the same, said means for applying a fluid pressure comprising first and second fluid conduits each of which communicates with one of said opposed chambers.

2. A display comprising:
   a casing comprising two concave sections and having a translucent window, one of the sections of the casing being provided with a plurality of compartments therein;
   a diaphragm mounted between said concave sections and dividing said casing into two chambers, said diaphragm being so arranged as to be movable to lie adjacent said window or remote therefrom;
   an indicia carried by said diaphragm, said indicia being divided into sections corresponding to the number of said compartments, each section of the indicia being carried by the diaphragm at the location of its respective compartment; and
   means for applying a fluid pressure to said diaphragm to move the same.

3. A display comprising:
   a casing comprising two concave sections and having a translucent window, the back section of the casing being provided with seven compartments corresponding to the arrangement of lines of a "box 8" design and the front section forming a single compartment with a window;
   a diaphragm mounted between said concave sections and dividing said casing into two chambers, said diaphragm being so arranged as to be movable to lie adjacent said window or remote therefrom;
   an indicia carried by said diaphragm, said indicia being divided into sections corresponding to the number of compartments, each section of the indicia being carried by the diaphragm at the location of its respective compartment; and
   means for applying a fluid pressure to said diaphragm to move the same.

4. The apparatus of claim 3 wherein the diaphragm is cup-shaped where it registers with the compartments of the back section of the casing.

5. A display comprising:
   a casing having a concave back section and a concave front section with a translucent window;
   a diaphragm mounted between the two concave sections, thereby dividing the casing into two chambers;
   and indicia carried by said diaphragm; and
   means for applying a fluid pressure to each of said chambers.

6. A display comprising:
   a casing having a back section and a front section;
   a plurality of opposed chambers in at least one of said sections;
   a translucent window on the face of the front section;
   a diaphragm means mounted between the said sections;
   an indicia in the front section carried by said diaphragm means in registry with each chamber of said one section;
   means for guiding each indicia; and
   means for applying a fluid pressure to said diaphragm means in each chamber.

References Cited

UNITED STATES PATENTS 3,091,876    6/1963    Cole _____ 40—28
3,237,591    3/1966    Pichel _____ 116—124

EUGENE R. CAPOZIO, *Primary Examiner.*

W. J. CONTRERAS, *Examiner.*